US009465518B1

(12) United States Patent
Koryakina et al.

(10) Patent No.: US 9,465,518 B1
(45) Date of Patent: Oct. 11, 2016

(54) METHOD AND SYSTEM FOR CREATION, ANALYSIS AND NAVIGATION OF VIRTUAL SNAPSHOTS

(71) Applicant: Parallels IP Holdings GmbH, Schaffhausen (CH)

(72) Inventors: Elena A. Koryakina, Moscow (RU); Alexey B. Koryakin, Moscow (RU)

(73) Assignee: Parallels IP Holdings GmbH, Schaffhausen (CH)

(*) Notice: Subject to any disclaimer, the term of this patent is extended or adjusted under 35 U.S.C. 154(b) by 0 days.

(21) Appl. No.: 14/838,314

(22) Filed: Aug. 27, 2015

Related U.S. Application Data

(63) Continuation of application No. 14/624,512, filed on Feb. 17, 2015, now Pat. No. 9,135,260, which is a continuation-in-part of application No. 14/258,842, filed on Apr. 22, 2014, now Pat. No. 8,959,055, which is a continuation of application No. 13/741,564, filed on Jan. 15, 2013, now Pat. No. 8,725,689, which is a continuation of application No. 12/248,929, filed on Oct. 10, 2008, now Pat. No. 8,364,639.

(60) Provisional application No. 60/979,126, filed on Oct. 11, 2007.

(51) Int. Cl.
*G06F 7/00* (2006.01)
*G06F 17/00* (2006.01)
*G06F 3/0482* (2013.01)
*G06F 17/30* (2006.01)

(52) U.S. Cl.
CPC ....... *G06F 3/0482* (2013.01); *G06F 17/30144* (2013.01); *G06F 17/30233* (2013.01)

(58) Field of Classification Search
CPC ............. G06F 17/30067; G06F 2201/84; G06F 11/1435; G06F 11/1458; G06F 17/30088
USPC ........................................... 707/639
See application file for complete search history.

(56) References Cited

U.S. PATENT DOCUMENTS

| 7,356,679 | B1* | 4/2008 | Le | G06F 17/30067 |
| | | | | 707/E17.01 |
| 7,853,566 | B2* | 12/2010 | Cisler | G06F 9/4443 |
| | | | | 707/654 |
| 8,495,024 | B2* | 7/2013 | Cisler | G06F 9/4443 |
| | | | | 707/654 |

\* cited by examiner

*Primary Examiner* — Robert Beausoliel, Jr.
*Assistant Examiner* — Michael Pham
(74) *Attorney, Agent, or Firm* — Bardmesser Law Group

(57) ABSTRACT

A method for generation of virtual images on a computer system having a Virtual Machine (VM), including (a) generating a virtual image of the VM that includes a state of the VM's disk at a particular moment in time; wherein the virtual image is viewable via a host-side graphical representation component for viewing a history of virtual images representing states of the VM's disk at prior moments in time; (b) storing the virtual image as multiple chunks or partitions; (c) from the host side, acquiring a state of the VM's memory and adding the state of the VM's memory to the virtual image; (d) configuring the graphical representation component to display only selected virtual images based on user selection, and (e) in the graphical representation component, displaying a representation of differences between at least two of the virtual images.

17 Claims, 6 Drawing Sheets

METHOD AND SYSTEM FOR CREATION, ANALYSIS AND NAVIGATION OF VIRTUAL SNAPSHOTS

CROSS-REFERENCE TO RELATED APPLICATIONS

This application is a continuation of U.S. patent application Ser. No. 14/624,512, filed on Feb. 17, 2015, which is a continuation in part of U.S. patent application Ser. No. 14/258,842, filed on Apr. 22, 2014, which is a continuation of U.S. patent application Ser. No. 13/741,564, filed on Jan. 15, 2013, which is a continuation of U.S. patent application Ser. No. 12/248,929, filed on Oct. 10, 2008, which is a non-provisional of U.S. Provisional Patent Application No. 60/979,126, filed on Oct. 11, 2007, which are both incorporated by reference herein.

BACKGROUND OF THE INVENTION

1. Field of the Invention

The present invention relates generally to Virtual Machine (VM) technology and, more particularly, to a method and system for generation and management of snapshots of a VM and creation of Centralized Integrated Backup (CIB).

2. Background Art

In the past decade, capabilities of computer systems have increased significantly. Computer systems process large volumes of data, which is changed or updated constantly. In order to track changes of data, files located on a system Hard Disk Drive (HDD) are usually copied, and a system data backup based on these files is created. This enables a user to access previous versions of files, as well as to protect data from possible system failure.

Typically data backup performed on a physical machine does not require saving of any system configurations because the structure of the physical machine remains the same. Thus, making the snapshot of data from HDD is sufficient for generating a backup. Conventional data snapshot is generated by an Operating System (OS) of the physical machine.

The industry trend of virtualization and isolation of computer system resources makes the task of generating backups more complex. A Virtual Machine (VM) is a type of an isolated Virtual Execution Environment that runs on the same physical machine simultaneously. Each VM instance executes its own OS kernel. Support of Virtual Machines is implemented using a Virtual Machine Monitor and/or a Hypervisor.

Virtualization allows running a number of VMs on the same physical machine or processor. Thus, scheduling and controlling efficient backups of data among numerous VMs becomes even more crucial. Furthermore, configuration of each of the VMs can be changed by a user. Thus, saving snapshots of all previous states of a particular VM into a backup is critical.

Typically data backups are performed by system administrators according to backup schedules. With Virtual Machines it is important to allow users to perform backups at any time, when the state of the VM is about to change.

Accordingly, there is a need for a system and a method for generating snapshots of various states of the VMs by users and incorporating these virtual snapshots into an integrated backup.

SUMMARY OF THE INVENTION

The present invention is directed to method and system for generating and managing snapshots of VM (i.e., virtual snapshots) or a group of the VMs and creating a Centralized Integrated Backup (CIB) for the VM or the group of the VMs. The proposed method allows users to roll back to any previous version or state of the VM and to instantiate this version using the logic encapsulated in a virtual snapshot of the VM.

After the virtual snapshots are generated, a user can see the differences between any of the snapshots generated at various times. A virtual snapshot viewer can be used for analyzing a snapshot tree and displaying the changes to the user. The virtual snapshot tree can be integrated into centralized backup.

According to the proposed method, the user can generate a virtual snapshot at any time without special permission from a system administrator. The user can also set up a time for generating a virtual snapshot or create a schedule for automatically generating the virtual snapshots at critical points. Thus, the backup process can be self-administered.

A virtual snapshot is generated by virtual execution environment and the OS of the physical machine is not directly involved in generation of the virtual snapshots. The virtual snapshots can be taken without interrupting operation of the VM. The virtual snapshot, unlike a conventional physical snapshot, contains not only data from HDD, but the VM context and the scripts for executing the virtual snapshot. When the virtual snapshot is executed, the corresponding version of the VM with the data from HDD and the VM context data is instantiated.

In another embodiment, a method for generation of virtual images on a computer system having a Virtual Machine (VM), including (a) generating a virtual image of the VM that includes a state of the VM's disk at a particular moment in time; wherein the virtual image is viewable via a host-side graphical representation component for viewing a history of virtual images representing states of the VM's disk at prior moments in time; (b) storing the virtual image as multiple chunks or partitions; (c) from the host side, acquiring a state of the VM's memory using a guest-side Application Process Interface (API) and adding the state of the VM's memory to the virtual image; (d) configuring the graphical representation component to display only selected virtual images based on user selection, and (e) in the graphical representation component, displaying a representation of differences between at least two of the virtual images.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
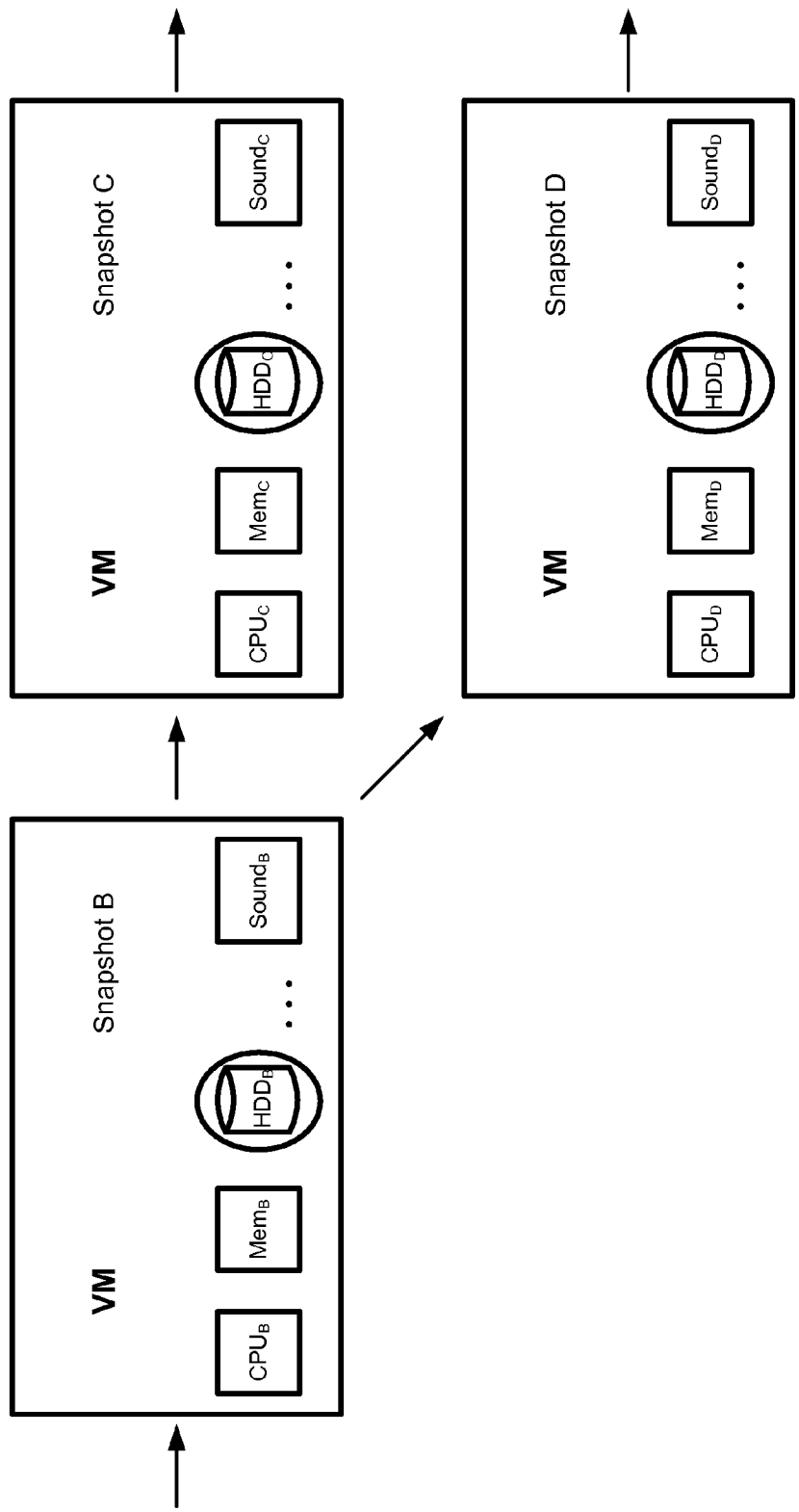
FIG. 1 illustrates an example of structure of various virtual snapshots generated for a VM.

Reference will now be made in detail to the embodiments of the present invention, examples of which are illustrated in the accompanying drawings.

The present invention is directed to a method and a system for generating virtual snapshots of a VM or a group of the VMs and creating a centralized integrated backup (CIB). The proposed method allows users to roll back to any previous version of the VM and instantiate this version using the logic encapsulated in a virtual snapshot of this VM. In one embodiment a method and a system for generating the virtual snapshots of a VM are provided. According to this embodiment, after the virtual snapshots are generated, they can be combined into a virtual snapshot tree.

In one embodiment, a virtual snapshot viewer can be used for analyzing a snapshot tree and displaying the changes to the user. The virtual snapshots are arranged into a tree in a chronological order. Thus, a user can see the differences between any of the snapshots generated at various times. The virtual snapshot viewer, according to the preferred embodiment, allows the user not only to see just the state of the virtual HDD at the moment when the snapshot was taken, but the VM context (i.e., the state of the virtual CPU, state of memory registers, state of system registry, flags, etc.) as well.

According to the proposed method, the user can generate a virtual snapshot at any time without a special permission from a system administrator. The user can set up a time for generating a virtual snapshot. The user can also set up a management console, which can be responsible for automatically generating the virtual snapshots at critical points. Thus, backup process can be self-administered.

This can be important when the user is about to install a new application or change the configuration of a VM, which may negatively affect the functionality of the VM. In this case, the user can generate a virtual snapshot reflecting the last state of the VM prior to the new application being installed. This way, if the VM gets corrupted by the new application, the user can return to any of the previous states of the VM.

Generation of a virtual snapshot does not interrupt operation of a VM. The virtual snapshots are analyzed and viewed by a user "off line" via the virtual snapshot viewer that can be implemented as a browser-like graphical user interface (GUI). Thus, the VM continues to run while various versions (states) of the VM are assembled into the tree and analyzed. The proposed method provides efficient version control not only of the logical data entities, such as files located on virtual HDD, but also of the VM context including, for example, state of virtual CPU, state of memory registers, state of system registry, flags, state of the virtual disk, state of virtual devices, etc.

The snapshot browser can be viewed as having two major parts: a device state analyzer and a state representation subsystem that presents data in user friendly form (readable text view, GUI tree view, GUI file/folder comparison view, such as used in Araxis Merge (from Araxis. Ltd), in both integral of differential/incremental form, similar to what "CVS diff" command performs, etc.).

The device state analyzer is a virtual device-dependent part of virtual snapshot image viewer. For example, the most convenient analysis which can be provided for virtual HDD state is representation of virtual HDD state as a logical structure with partitions, folders and files. In this case, the most convenient state representation subsystem can be designed as a file tree browser started from list of partitions (topmost tree layer), root folders, subfolders and files. All items of such tree can be analyzed through the snapshot time tree where each file, folder, partition or virtual disk at all have version corresponding to a time when the snapshot was created.

An example of convenient file tree browser/comparer system is Araxis Merge, which compares two folders, shows differences between them, and so on. Files can be compared in graphical form using color markup or just viewed with a corresponding editor associated with a file type, or shown with the differences highlighted or otherwise displayed in a line-by-line manner, showing line-by-line differences between two or more versions of a file.

Another example of browser is Time Machine from Apple Inc. where folders are located in graphical "universe" and navigation between folders is available to the user. When the folder is selected it is magnified on a foreground of the display along with some content being indicated. Herein each folder corresponds to state of the file system in some particular time period.

The present invention is primarily directed to Virtual Machines and analyses raw VM snapshot states which is primarily used for saving the entire VM state and rolling back the current VM state to some prior VM state.

File trees can be started as from logical partition, folder, file hierarchy as from snapshot time tree where user first selects a snapshot, and then goes to a corresponding logical file tree browsing. A combination of the two representation methods can also be used. The user can select a snapshot, go to a corresponding file tree, select a folder or file and analyze (compare) with other versions (from other snapshots).

The device state analyzer depends on device logic. If the device is not storage device, e.g., a sound card, its state can be represented in simple form, like "playing back sound with volume 10" or like an internal register view. Also, a list of OS device drivers installed/enabled-disabled/running may be indicated.

State of whole VM can be also analyzed as complex logical structure included also operating system dependent information like registry, running processes, state of specific programs, performance counters like memory usage, CPU usage counters, etc.

Invention can be used with full snapshots as well as with incremental ones. The structure of the snapshot data storage does not matter. The logical structure of snapshot data can be determined and analyzed, with corresponding decomposition and separate (different) logic state parsers/analyzers (virtual HDD data is analyzed in one way, the state of operating system is analyzed in another way, and so on).

The virtual snapshot image viewer can utilize folder and file data analyzer for data from the snapshots, although this is exemplary only, and the invention is not limited to file browsing concepts. The invention can also be used for analysis of more complex logical data which can be gotten from entire VM snapshot state.

Efficient version control is provided by the structure of a virtual snapshot illustrated in FIG. 1. Virtual Snapshots B, C and D of a Virtual Machine VM are generated at various times. Each of these snapshots contains information reflecting the state of the VM at points in time B, C and D accordingly. Typical VM configuration includes CPU, memory, virtual HDD. The information contained in the virtual snapshots of the VM reflects the following entities:

(a) snapshot of the state of a virtual CPU, which contains the configuration of the VM as well as the scripts for instantiating or automating the VM (see U.S. Patent Application No. 60/948,779; Filed: Jul. 10, 2007, entitled METHOD AND SYSTEM FOR UNATTENDED INSTALLATION OF GUEST OPERATING SYSTEM, incorporated herein by reference in its entirety);

(b) snapshot of the state of a virtual memory of the VM, which contains the data stored in the memory of the VM;

(c) snapshot of the state of a virtual HDD, which contains the data stored on the HDD of the VM.

The invention can also work with snapshots where some components (like state of the portion of memory/cpu state/disk/file system areas) or their parts can be locked or use enforced security access rules/ACL and, therefore, requires some specific allowance for access—e.g., for reading and/or displaying it is UI/command tools, or for creation of a derivative snapshot with this particular component once the component is modified.

This can be done using encryption, and/or access rights controlled by special software (e.g., OS user permissions, security servers like Kerberos/Radius, or dedicated application intended for implementation or rules/access rights for snapshots), or in hardware, using support of such hardware protection as memory protection feature of IA64 architecture processors, x86 Intel TXT/AMD SVM support, and others.

Alternatively other entities, such as, for example, VM's state of sound and state of virtual network card, state of virtual CD ROM and so on, can be included into the virtual snapshot. Thus, the particular version of the VM, for example, the one used at the times B, C or D can be instantiated.

The invention can also be used with a "reduced" VM that has a CPU and memory only. States of such reduced VMs can be also used for logical state analysis, e.g., for some resources analysis which can be shared with other VM or host OS (like shared memory)

Figure 2:
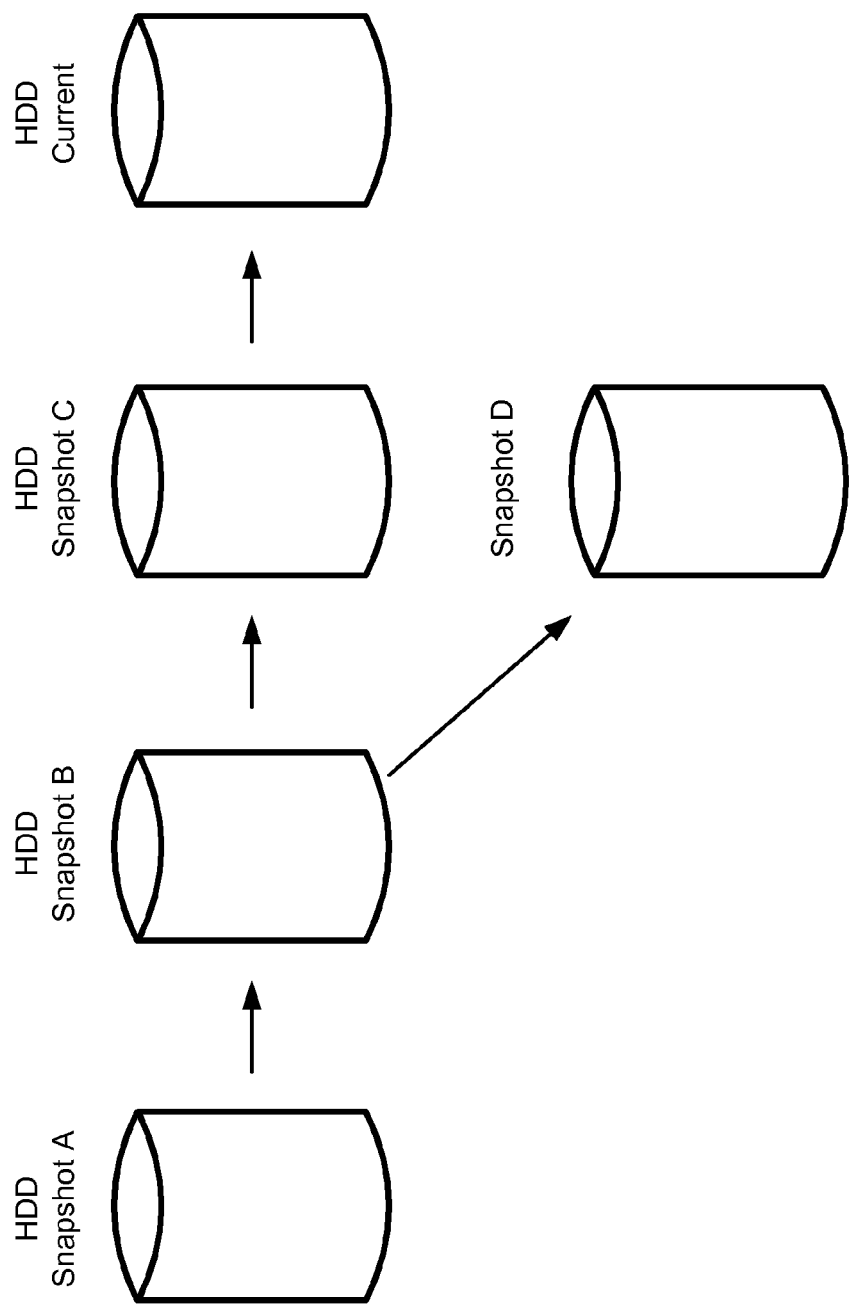
FIG. 2 illustrates a tree of HDD snapshots.

The state of data for each state of the VM is contained in the snapshot of the VM's HDD, as shown in FIG. 2. The snapshots of a virtual HDD can be arranged into a chronological tree, which has a parent-child hierarchical structure. For example in FIG. 2 snapshot A is a parent to snapshot B, snapshot B is a parent to C and C in turn is a parent to the snapshot of a current virtual HDD. Also snapshot D is a child of snapshot B. According to the preferred embodiment, the snapshot tree can be rendered to a user via a special browser-type GUI, in other words, a virtual snapshot image viewer.

Figure 3:
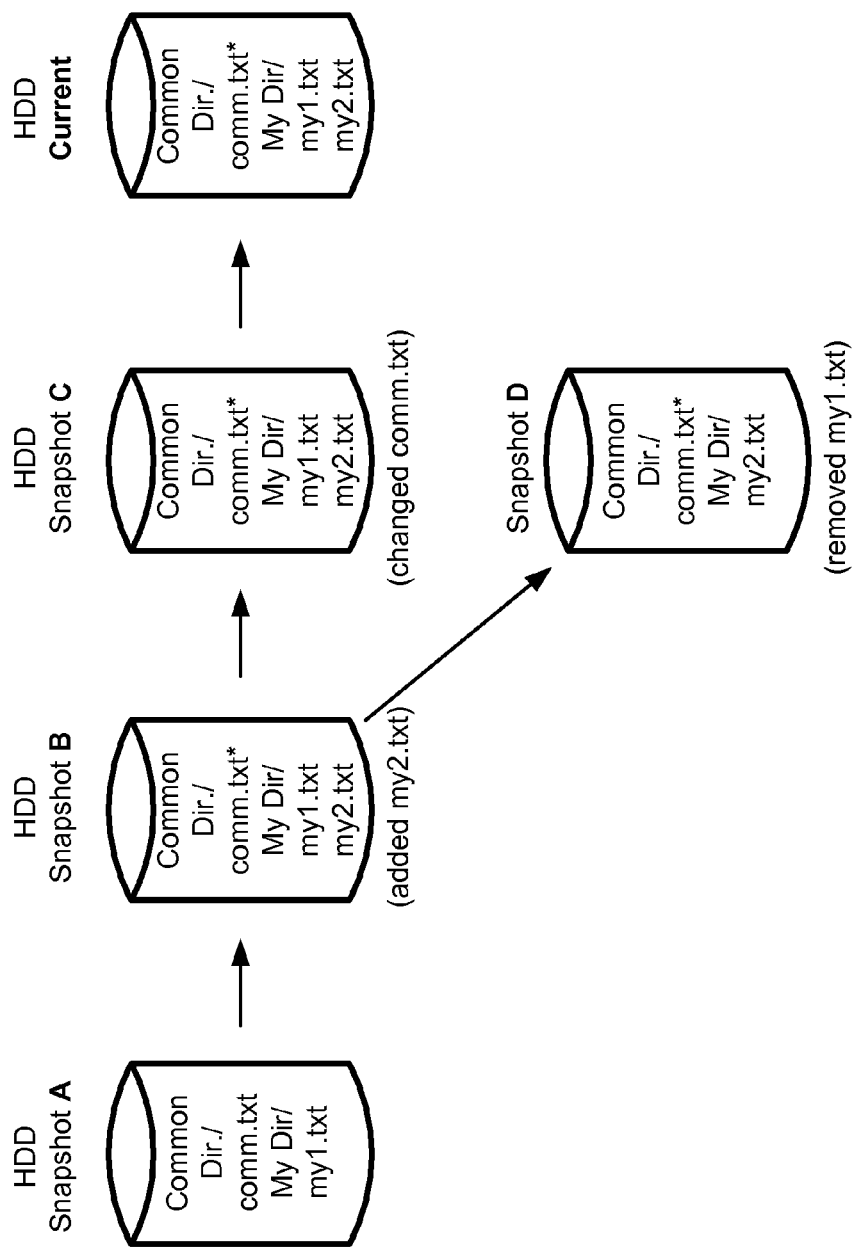
FIG. 3 illustrates an example of tracking changes between HDD snapshots.

This exemplary snapshot tree is illustrated in more detail in FIG. 3. The most critical for user information is the differences between the snapshots of the VM's virtual HDD. In FIG. 3 snapshot B is different from its parent A by an additional file my2.txt. The snapshot D is different from its parent B by having file my1.txt removed. The snapshot C is different from its parent B because of the changes in file comm.txt.

In the preferred embodiment, the snapshot tree displaying the differences between the snapshots is presented to a user via a snapshot image viewer. The snapshot image viewer analyses the snapshots and renders the results to the users in a convenient graphical form. Thus, users can have control over various versions of the VM and/or various version of a number of the VMs. The snapshot image viewer can allow a user to see the entire snapshot tree. The user can also use the snapshot image viewer to compare any of the virtual snapshots and for restoring the VM to the state captured by any of the snapshots within the tree.

The snapshot image viewer, in one embodiment, can be implemented as an browser type GUI. A user can simply click on any node of the snapshot tree to view the information about a particular version of the VM captured by this snapshot. Any version of the VM can be instantiated from a particular node of the virtual snapshot tree displayed in the snapshot image viewer GUI by, for example, double clicking or right clicking on the particular node of the virtual snapshot tree.

During creation of the snapshot and further representing VM state in the snapshot image viewer, the snapshot can be saved and display a state of a particular area of guest OS kernel—such as a state of memory assigned to Windows pools, caches, kernel structures, or assigned to particular modules/drivers residing in guest OS kernel, a map of kernel (showing a correspondence between emulated physical memory and virtual memory of the kernel and appropriate locations of drivers/OS components inside it). Also, it can take into account the fact that some regions of memory can be stored in emulated RAM and paged out to a guest OS page file—and these memory can be combined into single viewable object with modification ability.

In one embodiment of the invention the user further can modify the snapshot/VM parameters, e.g., by editing data that represents virtual snapshot. Another way may be realized by configuring procedures required for snapshot deployment (e.g., by choosing a set of scripts) such that a set of data represents a ready-to-start VM that conforms to user settings.

Some of editable parameters may be: enable or disable drivers; replace files (e.g., Dynamic Link Library (DLL)/drivers for different versions); update registry inside snapshots of OS Windows VMs; disable some processes running in the VM when snapshot was created; change quotas, e.g., disk space available to VM, modify state of the RAM related to guest OS kernel, components of user processes and data both on emulated RAM or in the swap file and so on.

Further group operations on VM snapshot may be available either for restoring group of selected snapshot on the computing system or while editing snapshot parameters. E.g. defined by the user driver or the process may be chosen for disabling before restoring group of snapshots. Indeed, other parameters and data may be treated in the group operations, including shown above.

Group operations further may be performed on a full tree or sub-tree of snapshots, where changing properties in low level snapshot in the tree provide corresponding changes in all snapshots lying above snapshot with corrected properties. Here, for example, the whole tree can be analyzed to find in which initial or parent snapshot this parameter was occurring first and modify the tree at that location, or, alternatively, generate a new snapshot with the updated state as a leaf. Here, for example, a particular driver disabled in parent snapshot will be disabled in all "children" snapshots. The properties, as one option, can include file contents and/or file metadata of files in the VM.

Also, note that difference between snapshots can exclude rapidly-modifiable area, such as places for storage of interrupt-related data/buffers/etc., because they change constantly, and can be hard to view.

The invention also can be applied to partial backups and snapshots of images that are not "full" images (which contain only part of OS, and not the entire guest OS kernel, one example of which is disclosed in U.S. Patent Application 60/774,216; Filed: Feb. 17, 2006, entitled SYSTEM AND METHOD FOR USING VIRTUAL MACHINE FOR DRIVER INSTALLATION SANDBOX, incorporated herein by reference in its entirety).

Figure 4:
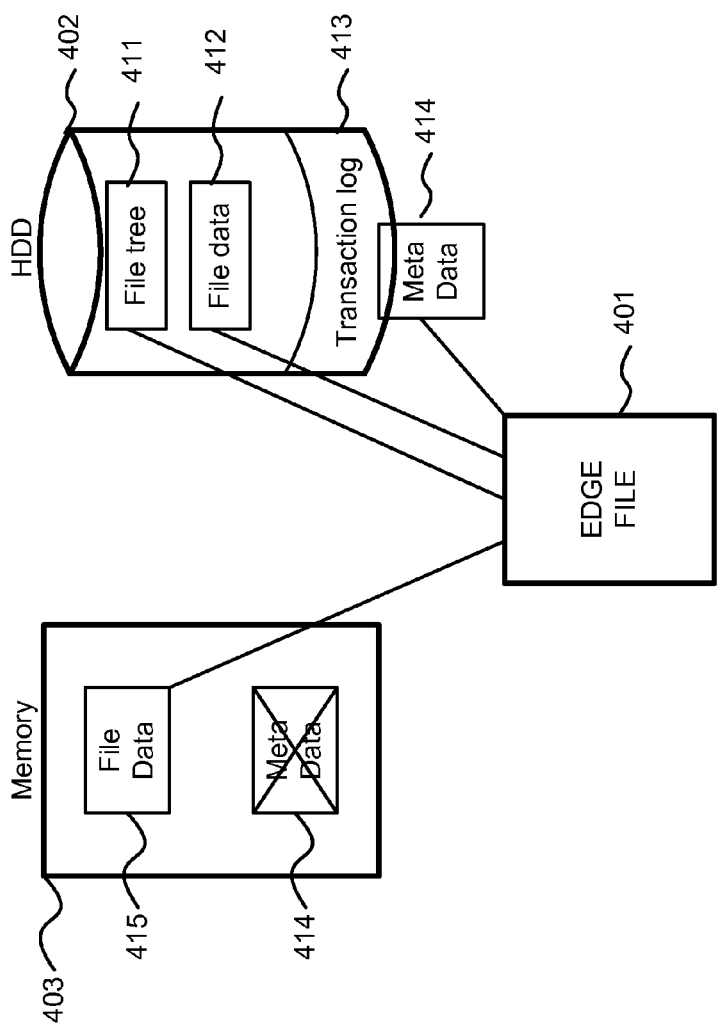
FIG. 4 illustrates an example of an "edge file" copied during generation of a virtual snapshot.

Generated virtual snapshots described above can have errors caused by an "edge file." When a file is being modified at the same instance when a virtual snapshot is generated, it can become an "edge file." The "edge file" is included into the snapshot either partly or in a corrupted form. The "edge file" scenario is illustrated in FIG. 4. File 401 is the "edge file," and is in the process of being modified while the virtual snapshot is generated. When the file 401 is saved, part of it is saved into memory 403 and part of the file is saved into HDD 402. In particular, the file data 415 can be stored in memory 403, while file metadata 414 can be (at the moment of the snapshot) in transition to HDD 402, where it is stored into a transaction log 413. Some file data is stored into a file data sector 412 of HDD 402 and some data goes into file tree sector 411 of HDD 402.

When a simple snapshot is generated, it can include a state of memory 403 and a state of HDD 402. Virtual snapshot image viewer, according to one embodiment, can only use the information stored on HDD. Thus, in case of the "edge file," some information will be lost and will not be presented to the user. Therefore, the virtual snapshots are not validated. In the preferred embodiment this problem is solved by a special arrangement illustrated in FIG. 5

Figure 5:
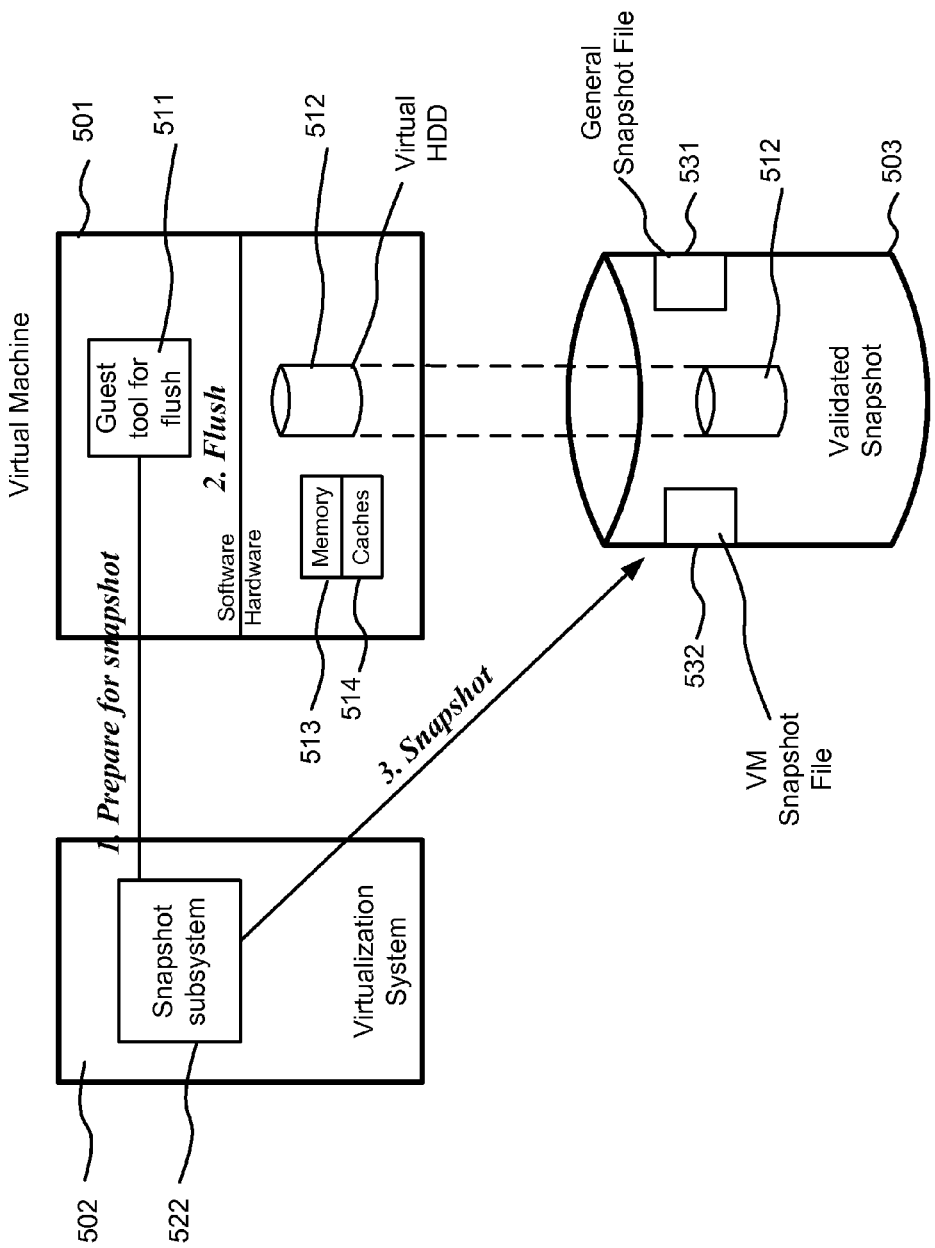
FIG. 5 illustrates a system for generation of a validated virtual snapshot.

In FIG. 5 a virtualization system 502 manages a VM 501. The virtualization system 502 has a snapshot subsystem 522, which is responsible for generation of the snapshots of the VM 501. The VM 501 runs a guest tool 511 for flushing data within its software sector. The guest tool 511 prepares data for the snapshot subsystem 522 before it is flushed onto a virtual HDD 512 from physical memory 513 and caches 514. Then the data from memory 513 along with cached data is flushed onto virtual HDD 512. There is no data lost in the process and the state of the virtual HDD 512 is included into a snapshot generated by the snapshot subsystem 522. The new VM snapshot file 532 with all the data on virtual HDD 512 is saved onto physical system HDD 503 and can be added to a virtual snapshot tree.

The virtual HDD 512 is validated because all the data has been flushed and there was no data lost during the snapshot. Therefore the snapshot file 532 is validated, unlike a general snapshot file 531 generated by snapshot subsystem directly, without using the guest tool for flush 511 of the VM 501.

The three-phase method of generating a virtual snapshot depicted in FIG. 5 produces validated snapshot 532. If the steps of preparing for snapshot and flushing data are omitted, the non-validated snapshot 531 is produced. Both types of virtual snapshots can be used depending on user preferences. Generation of a validated snapshot usually takes longer. Alternatively, a complex snapshot can be generated. The complex snapshot can include VM context such as, for example, state of virtual CPU, state of memory, state of the registers, state of system registry, flags, state of the virtual disk, etc. The VM context included into a snapshot is not located entirely in the HDD files. In this case the virtual snapshot image viewer can accurately display all of the snapshots to a user without having to go through a snapshot validation process. In this case snapshot image viewer should include a complex state analyzer which partially collects information from virtual HDD image and memory snapshots.

In an alternative embodiment, a disk of a stopped VM can be also considered as a latest snapshot (or a portion of a snapshot, with other elements, such as CPU state, recovered by other means). Thus, a stopped VM can be also considered as extension of the idea embodied in this application. The disk of a stopped VM contains up to date/latest files/directories and their content, which can be used as a state of the VM in the file version tree representation with corresponding content difference comparisons.

Additionally, a running VM can include a continuously updateable snapshotted state that includes momentum disk state and memory. The momentum state can be considered a latest snapshot and used in the file version comparison. Because of non-atomic state comparison, a stable/non-modifiable disk and memory state is needed for the period of analysis. A temporary or permanent VM pause or freeze can solve the problem. The stopped and paused VM states can therefore be used as additional snapshots containing the latest files state.

As an additional embodiment, different formats of different VMs or different formats of the same VM may be explored or browsed by the user in the viewer at the same time. The main format is a snapshot format as in application, the second one is a suspended VM format and the third is a running VM, where the system gives a visual indication of data that is in the process of being changed. In the latter case, the indicated state of the VM may be updated in a browser periodically, e.g., once a second, or once every few seconds, and correspondingly, only minimal data may be stored during the period. This data may be used for restoration of the VM in the indicated state by user request. Another embodiment focuses on a group of VMs. For each of the VMs, a virtual snapshot tree is generated. The snapshot trees of all of the VMs are combined into Centralized Integrated Backup (CIB). The CIB can be managed by a system administrator via a central management console including a virtual snapshot image viewer GUI or more complex snapshot browser tool which can edit as shown above, monitor and compare complex logical state of VMs. Thus, a system backup capability is provided through generation of virtual snapshots for the VM's running on the computer system and implementation of a managements console with browser capabilities.

Another moment of snapshot image viewer is file or folder restoring. File and folder restoring can be implemented in following ways:

1) On a running VM:
  Through special guest tool installed in the VM which copies/deletes files or folders gotten from snapshot analyzer to virtual HDD by using guest OS API.
2) On a stopped VM:
  Through offline tool like Parallels Image Explorer (or correspondent analogues libraries or applications) which can perform operations like read/write/delete files and folders on offline virtual HDD images.
3) On a suspended/paused VM:
  Through offline tool like Parallels Image Explorer with further VM restart (without resuming from pause);
  Through special guest tool installed in the VM which copies/deletes files or folders and through special guest tool which gathers all request updates from virtual snapshot image viewer and passes request to guest tool after VM resuming.

As a further embodiment, the viewer/graphical representation component can display snapshots from multiple Virtual Machines. Note that the snapshot itself is normally generated by the Virtual Machine itself, and, in this case, the snapshot can be generated by multiple Virtual Machines. The viewer can therefore display snapshots from such multiple Virtual Machines simultaneously, as if they were generated by a single machine, with appropriate graphical or iconic designation of which Virtual Machine the particular snapshot comes from (of, for example, by using a name for the Virtual Machine, and ID of the Virtual Machine, or some other identifier, such as the type and version of the operating system of that particular Virtual Machine).

As a further embodiment, the snapshot can be stored not as a single object or file, but as multiple chunks or partitions. Some file systems, for example, FAT32, have a relatively low (by modern standards) upper size for the file with which they can work—for example, in the case of FAT32, the maximum size of the file is 4 GB. On the other hand, many modern Virtual Machines require snapshots that are often tens of gigabytes. Therefore, the viewer can work with snapshots that are actually divided up into smaller pieces, such as subfiles, or individual partitions (virtual or real).

As a further option, the snapshots may be compressed.

As a further option, rather than storing the entire snapshot, which includes the state of the Virtual Machine's disk, the memory, the CPU (registers and flags), and any caches, the state of the CPU may be omitted for the particular snapshot. As a practical matter, many users are less interested in the state of the CPU, and often less interested in the state of memory, than they are in files that are stored as part of the snapshot of the Virtual Machine. In other words, rather than scoring the entire snapshot, working with images of the virtual disk of the Virtual Machine is often acceptable (i.e., in this case, the snapshot is reduced to the image, since the memory/CPU state is not included). Note also that the state of the disk does not change as often as the state of the memory, and certainly not as often as the state of the CPU. As such, the storage of the snapshot can be reduced to storage of only the image of the Virtual Machine, with an option to designate the snapshot as either representing or not representing the current state of the CPU at the time of creation of the snapshot, but possibly representing the state of the memory and/or the CPU at some earlier point in time.

As a further option, a utility can be provided on the host side that pings the Virtual Machine for the state of the CPU and/or the state of its memory. This can be done using standard APIs that the Virtual Machine has on the guest side, as long as the host side/VMM knows which guest OS is running on the Virtual Machine side.

Note also that for purposes of comparison of snapshots, both active and inactive Virtual Machines can be used. In the case of inactive Virtual Machines (i.e., Virtual Machines that are not currently registered as active with the Virtual Machine Monitor or hypervisor), the user can utilize a host side utility to identify files on the systems' hard drive that may potentially represent VM images (full images or differential/incremental images), and use those images for viewing in the viewer as well.

In the case of encrypted image, note that the encryption itself is performed by the Virtual Machine on the guest side. However, the viewer is normally on the host side. Therefore, if the images or snapshots are encrypted, the user would need to know the password or key in order to view the encrypted snapshots or images using the viewer.

Note also that the user can merge snapshots. For example, if two snapshots are relatively similar to each other, for example, only a few files may be different, representing a few small edits, in that case, the user can decide to merge the snapshots/images, accepting the later or earlier version of the file as the final version, thereby reducing the total number of snapshots that the system needs to work with.

In the case of inactive Virtual Machines, the file system corresponding to the Virtual Machine may be unmounted, in which case, the image would need to be parsed to identify a logical structure. Therefore, if these images were to be included in the viewer, a utility for parsing of the Virtual Machine image (or, more generally, the entire drive, looking for potential unmounted Virtual Machine file systems) may be needed.

As a further option, the merging of snapshots from two or more Virtual Machines may be implemented. The one use case may be, for example, a developer who clones a Virtual Machine that he is working on at the office prior to travel. Some changes may be made by the developer while he is traveling, while other changes are made by colleagues back at the office, upon return, the merger of the original Virtual Machine snapshot tree and the cloned Virtual Machine snapshot tree can be implemented, if the user feels that maintaining multiple such trees is unnecessary.

Figure 6:
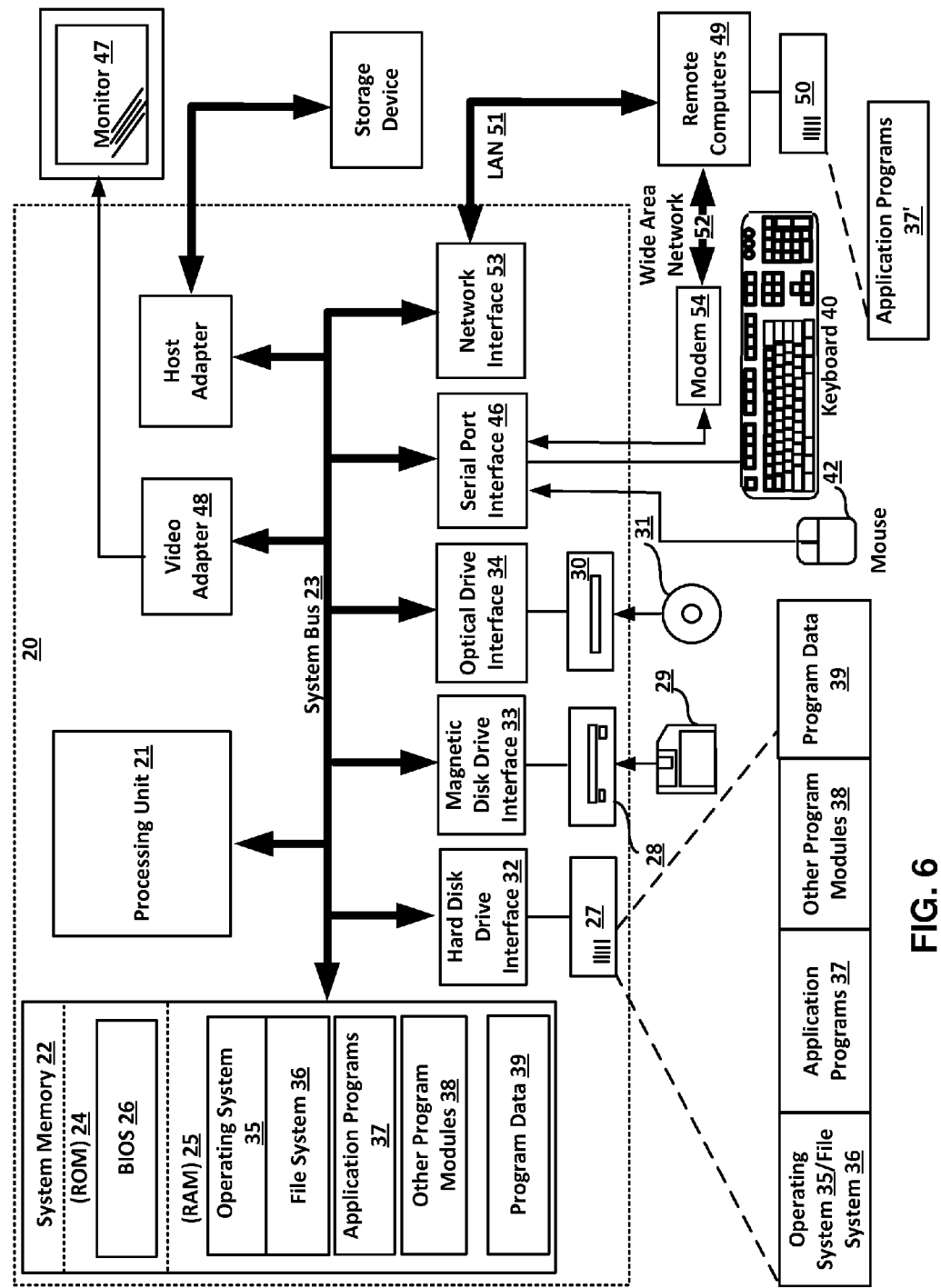
FIG. 6 illustrates an exemplary computer system on which the invention may be implemented.

With reference to FIG. 6, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), Third Extended file system (ext3), Hierarchical file server (HFS), Z file system (ZFS), Global file system (GFS), or Oracle cluster file system (OCFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and system have been achieved. In particular, it should be appreciated by those skilled in the art that system and method described in one of the embodiments provides for efficient backup of virtual execution environment while significantly reduces system administration costs.

This invention is mostly independent from guest OS installed inside virtual machine. Therefore this invention can be used for implementation file version control system or complex CIB system which are independent from guest OS too and can be used with all VMs launched in corporate network.

It should also be appreciated that various modifications, adaptations, and alternative embodiments thereof may be made within the scope and spirit of the present invention. The invention is further defined by the following claims.

What is claimed is:

1. A method for generation of virtual images on a computer system having a Virtual Execution Environment (VEE), comprising:
    (a) generating a virtual image of the VEE that includes a state of the VEE's disk at a particular moment in time;
    wherein a history of virtual images representing states of the VEE's disk at prior moments in time is viewable via a host-side graphical representation component for viewing;
    (b) storing the virtual image as multiple chunks or partitions;
    (c) from the host side, acquiring contents of the VEE's memory using an Application Process Interface (API) and adding the contents of the VEE's memory to the virtual image;
    (d) configuring the graphical representation component to display only selected virtual images based on user selection, and
    (e) in the graphical representation component, displaying a line-by-line representation of differences between at least two of the virtual images.

2. The method of claim 1, further comprising adding the virtual image to a virtual image tree, wherein the virtual image tree is viewable in the graphical representation component.

3. The method of claim 2, wherein the virtual image tree is rendered to a user by the graphical representation component.

4. The method of claim 1, further comprising selecting one virtual image as a base virtual image and a group of virtual images, wherein for each virtual image from the group differences between the virtual image and the base virtual image are indicated.

5. The method of claim 1, wherein the graphical representation component is configurable to edit any of the following of the virtual image:
    system constants;
    list of running processes;
    VEE processes conditions and priorities;
    performance parameters;
    list of OS device drivers installed/enabled-disabled/running;
    file system data related to file system installed on the HDD or HDD partition; and
    a part of file system, including any of
    (a) transaction log or Master File Table or directories,
    (b) file system transaction log,
    (c) NTFS master file table,
    (d) Unix superblock; and
    (e) directories in NTFS, Third Extended file system (ext3), Hierarchical file system (HFS), Z file system (ZFS), Global file system (GFS), or Oracle cluster file system (OCFS).

6. The method of claim 1, wherein the virtual image includes any of:
    state of VEE configuration file;
    state of VEE Compact Disk Read Only Memory (CD ROM);
    state of VEE network configuration;
    a state of at least some of VEE parameters associated with the HDD; and
    state of VEE sound configuration.

7. The method of claim 1, further comprising restoring properties of the virtual image in a context of another VEE.

8. The method of claim 1, further comprising selecting another virtual image as a source of another VEE context.

9. The method of claim 8, further comprising restoring selected properties in a VEE context running on the computing system.

10. The method of claim 1, wherein the virtual image includes a state of a virtual CPU of the VEE at a time of the virtual image generation or earlier.

11. The method of claim 1, wherein the graphical representation component is configurable to edit any of the following in response to user commands:
(i) virtual image properties;
(ii) VEE properties;
(iii) contents of files in a VEE's file system; and
(iv) file metadata of files in a VEE's file system.

12. The method of claim 1, further comprising merging the virtual image and a virtual image of another VEE.

13. The method of claim 1, further comprising merging the virtual image and another virtual image of the VEE.

14. A non-transitory computer useable medium having computer executable program logic stored thereon for executing on a processor for generation of virtual images on a computer, the computer executable program logic comprising:
(a) generating virtual images of a Virtual Execution Environment (VEE) that each includes a state of a corresponding VEE's disk at particular moment in times;
wherein the virtual images are viewable via a host-side graphical representation component for viewing a history of virtual images representing states of the VEE's disk at prior moments in time;
(b) storing the virtual images as a tree, with the virtual images corresponding to leaves of the tree;
(c) from the host side, acquiring contents of memory of the VEEs using Application Process Interfaces (APIs) and adding the contents of the memory to the corresponding virtual images;
(d) configuring the graphical representation component to display only selected virtual images based on user selection, and
(e) in the graphical representation component, displaying a representation of line-by-line differences between at least two of the virtual images from different VEEs.

15. The medium of claim 14, wherein at least one of the VEEs is inactive.

16. The medium of claim 15, further comprising code for scanning a storage drive of the computer to identify a virtual image of the inactive VEE, and parsing the virtual image of the inactive VEE to analyze its logical structure.

17. The medium of claim 14, wherein the VEE is a Virtual Machine.

* * * * *